United States Patent [19]
Petrikat

[11] 3,935,516
[45] Jan. 27, 1976

[54] CAPACITOR WITH GLASS METAL CONDUCTIVE LAYER

[75] Inventor: Klaus Rudiger Petrikat, Buchenweg, Germany.

[73] Assignee: International Standard Electric Corporation, New York, N.Y.

[22] Filed: Apr. 3, 1974

[21] Appl. No.: 457,537

[30] Foreign Application Priority Data
Apr. 14, 1973   Germany............................ 2319052

[52] U.S. Cl. .................... 317/230; 317/242; 29/570
[51] Int. Cl.² .......................................... H01G 9/00
[58] Field of Search ............... 317/230, 242; 29/570

[56] References Cited
UNITED STATES PATENTS

| | | | |
|---|---|---|---|
| 3,054,029 | 9/1962 | Wagner et al. ..................... | 317/230 |
| 3,292,053 | 12/1966 | DiGiacomo......................... | 317/230 |
| 3,296,505 | 1/1967 | Sparrow et al...................... | 317/230 |
| 3,316,463 | 4/1967 | Comado et al. .................... | 317/230 |
| 3,337,429 | 8/1967 | Zind................................... | 317/230 |
| 3,423,643 | 1/1969 | Miller ................................ | 317/230 |

*Primary Examiner*—Andrew J. James
*Attorney, Agent, or Firm*—John T. O'Halloran; Menotti J. Lombardi, Jr.

[57] ABSTRACT

A glass-metal powder mixture, preferably including silver, is used in place of the usual epoxy resin-silver outer layer of a tantalum capacitor. This reduces temperature sensitivity during soldering and avoids penetration of silver into the graphite and manganese dioxide layers of the capacitor. Thinner layers of graphite and $MnO_2$ can be used and reduced carbonization provides improved conductivity. A small solder bead can also be used instead of dipping into a solder bath.

4 Claims, 1 Drawing Figure

U.S. Patent  Jan. 27, 1976  3,935,516
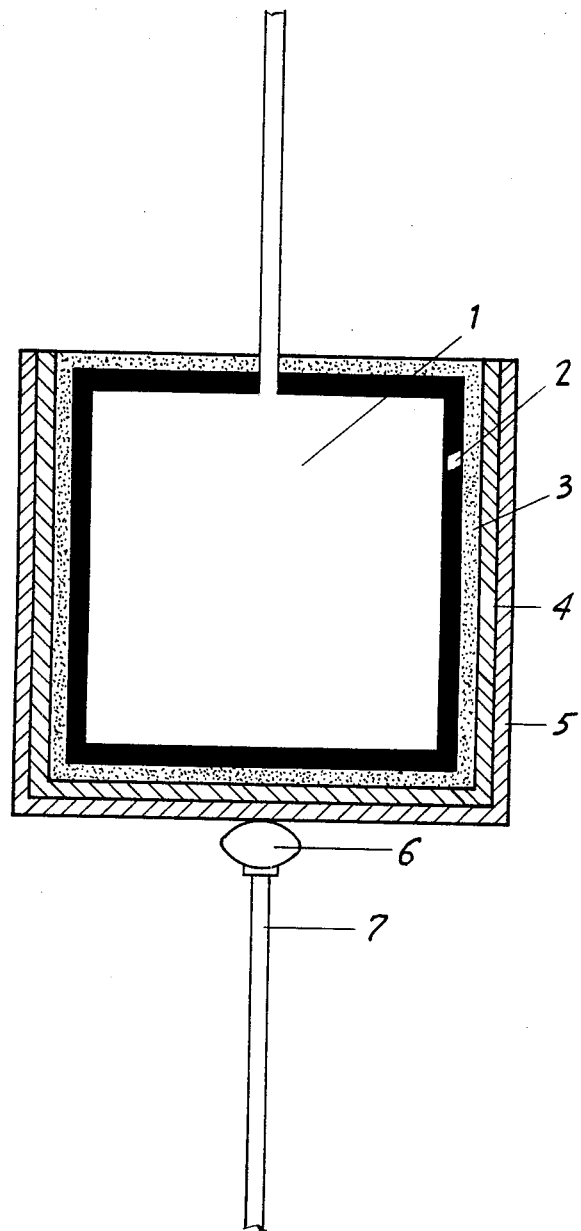

CAPACITOR WITH GLASS METAL CONDUCTIVE LAYER

BACKGROUND OF THE INVENTION

1. Field of the Invention

The present invention relates to capacitors having a porous electrode body coated with a dielectric metal oxide film and a layer of a material which emits oxygen, and particularly to an improved glass-metal outer layer for capacitors.

2. Description of the Prior Art

Normally such capacitors consist of a porous body of pressed or sintered particles of a film-forming metal, such as tantalum, in which there is embedded a lead-in wire of the same metal. Subsequently, the surface of this electrode body is subjected to anodic oxidation by means of conventional processes. The resultant oxide film which, when using tantalum, consists of tantalum-oxide ($Ta_2O_5$), serves as the dielectric of the capacitor. Since the oxide film easily becomes cracked, it is coated with a further layer, usually of manganese dioxide ($MnO_2$), having the property of emitting oxygen in response to passage of a strong electric current and the heat developed from this current. The oxygen preferably deposits at the fault point and oxidizes the surface thereof.

The manganese dioxide layer also forms the second electrode of the capacitor. Due to the relatively poor conductivity of manganese dioxide, it is necessary to make this layer as thin as possible and to coat it with another layer of improved conductivity. Usually this is a layer of fine carbon particles applied by dipping the electrode body into a colloidal graphite suspension.

Graphite has been used as an electrode coating because the suspension of the colloidal graphite penetrates into the pores of the electrode body coated with the layer of manganese dioxide. Since carbon is not solderable, a solderable coating is usually deposited onto the carbon. This coating consists of an organic binding agent mixed with fine silver particles. This mixture is used because the coating can be deposited in an economical dipping process. Subsequently, this silver layer is provided with a coating of solder metal to which the capacitor lead can be soldered.

The mixture of organic binding agent and silver has good electrical properties, but is very sensitive to increased temperatures. It has proved that the silver of the coating, at higher temperatures, alloys with the deposited solder metal. In addition, due to the solubility of silver in the solder metal, the silver is dissolved out of the organic binding agent, thus causing the binding agent to form a layer of poor conductivity. A further disadvantage is due to the fact that the silver also penetrates into the graphite coating and into the layer of manganese dioxide positioned therebeneath, so that these layers have to be relatively thick.

Up to now, the aforementioned disadvantages have been avoided by taking great care in depositing the layer of solder metal. The use of higher melting temperature metals and the time during which the silver coating may be exposed to higher temperatures, therefore, are subject to narrow tolerances. Besides using a coating of silver in an organic binding agent, other metal coatings are known which are deposited by way of spraying, electroplating or by melting-on suitable metals, such as copper, silver or gold.

In depositing the metal coating by means of the sputtering or spraying method, the graphite layer as well as the manganese-dioxide layer positioned therebeneath, must be relatively thick, because the metal drops hit the electrode body at a considerable speed. As a result, the thin electric layer can easily be punctured and cause short circuits.

SUMMARY OF THE INVENTION

It is therefore the primary object of the present invention to provide a tantalum capacitor with an improved counterelectrode which avoids the aforementioned disadvantages and prevents the outer layer metal from penetrating the graphite layer and from alloying with the further layer of solder metal.

This is accomplished by depositing a layer of graphite onto the manganese dioxide oxygen emitting layer and a mixture of pulverized glass with a metal powder of low oxidation properties and which has been solidified at a temperature of about 600°K.

The mechanical mixture of glass and metal effectively avoids the aforementioned disadvantages. The properties of the glass-metal mixture are substantially more constant with temperature changes than the previously employed layer of organic substances containing a metal. This eliminates the problem of disintegration and carbonization of the organic binding agent, and of the series resistance increasing to an undesired extent.

At the same time, experiments have shown that the metal as admixed to the glass, is no longer removed from the layer when dipping the electrode body into a bath of solder metal. This advantage was not predictable and was unexpected to those skilled in the art. For the first time, it is now possible to design the manganese-dioxide layer as well as the graphite layer considerably thinner.

With respect to the capacitor according to the present invention, both the pulverized or powdered glass and the metal powder are thoroughly ground and mixed in a mortar. The mixture may be from 15 to 50% by weight of metal powder and 50 to 85% by weight of a glass powder. After this, the mixture is suspended in a suitable bath, for example in distilled water. A coating of the mixture is deposited onto the capacitor by dipping the latter into the suspension. This deposition method offers known advantages, such as that of expedient and economical series production. The inventive coating is solidified by way of heating to about 600°K and is thereafter connected to a lead wire. Due to the high conductivity of the mixture, it is sufficient to provide for a point contact. It is no longer necessary to immerse the entire capacitor into a bath of solder metal in order to ensure sufficient contact.

The invention will now be described in greater detail with reference to an example and the accompanying drawing.

BRIEF DESCRIPTION OF THE DRAWING

The single FIGURE shows a section taken through the novel capacitor.

DESCRIPTION OF THE PREFERRED EMBODIMENT

The electrode 1 is a porous body produced by pressing tantalum powder and subsequent sintering at about 2300°K. The tantalum sintered body, by being dipped into an acidic solution, and by the application of a d.c.

voltage, with the electrode connected as the anode, is coated with a tantalum-oxide ($Ta_2O_5$) layer 2 forming the dielectric of the capacitor. The value of the voltage, referred to as the forming voltage, and the time of action are determinative of the thickness of the oxide layer. The surface of the dielectric layer 2 is coated with a further layer 3 of manganese dioxide ($MnO_2$). This layer, on one hand, serves as the counterelectrode for the sintered body 1. Relative thereto, however, specific conductance amounts from 10 to 100 ohms × cm should be avoided since this range is dependent upon the porosity of the applied layer. On the other hand, this manganese dioxide layer 3 serves to remove eventual imperfections of the dielectric coating by being partly reduced by the emission of oxygen, with the oxygen depositing at the imperfection points by forming tantalum-oxide. In order to obtain a good as possible layer of manganese dioxide, the manganese treatment is repeated several times. Usually, this is done up to 10 times. With respect to the present capacitor, however, it is sufficient to repeat the manganese treatment four to five times.

By dipping the entire electrode into a colloidal suspension of a graphite solution, a porous graphite coating 4 is deposited on the manganese dioxide layer. This provides an improved conducting connection between the layer of manganese dioxide 3 and a lead wire to be attached, and protects the sensitive manganese dioxide layer from external mechanical influences. The graphite layer may also be thinner than previously, which is of advantage since the graphite layer offers a considerable resistance.

In order to reduce the relatively high resistance within the graphite layer along its surface, it has been customary to coat the graphite layer with a further coating of an organic binding agent and silver. The connection between a lead wire and the capacitor body is then established by an additional layer of solder metal deposited onto the silver coating. Due to the temperature sensitivity of the organic binding agent, the latter is softened and carbonizes, thus dissolving the silver out of the binding agent. This layer 5, usually consisting of silver and the organic binding agent, is replaced, according to the present invention, by a mixture of finely powdered glass material and silver powder. Instead of the silver, it is also possible to use gold, copper and/or nickel. This mixture has a sufficient temperature stability which exceeds even that of manganese dioxide. There are also no technical difficulties in soldering a lead wire 7 to this layer 5.

The silver-glass powder mixture is deposited in a very simple way in that the two powders are finely ground in a mortar, mixed, and thereafter suspended in a liquid, such as distilled water. The capacitor is immersed in this suspension. Subsequently, the mixture is solidified by being heated to about 600°K.

Due to the high conductivity of the silver-glass mixture, it is no longer necessary to dip the entire capacitor body into a bath of solder metal. In fact, it is now sufficient for the lead wire 7 to be electrically connected to the silver-glass mixture by means of a small tin bead 6 within a local highly restricted area. This results in a saving of solder metal.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A capacitor comprising a porous inner electrode body, a first lead-in wire embedded in said body, a dielectric metal-oxide film of the metal of said inner electrode over said body, a manganese dioxide electrode layer over said dielectric metal-oxide film, a conductive layer of graphite over said manganese dioxide layer, an outer conductive layer of a solderable mixture of powdered glass and a metal powder resistant to oxidation and which solidifies at a temperature of about 600°K, a second wire lead, and a layer of solder metal disposed on said glass-metal layer within a limited contact area, said solder layer connecting said second wire lead to said conductive layer.

2. The capacitor of claim 1 wherein said inner electrode is of tantalum and said dielectric metal-oxide film is of tantalum oxide.

3. The capacitor of claim 2 wherein said mixture contains 15 to 15% by weight of a metal powder and 50 to 85% by weight of a glass powder.

4. A capacitor according to claim 3 wherein said metal powder is of the group consisting of gold, silver, nickel and copper.

* * * * *